(12) United States Patent
Kark

(10) Patent No.: US 6,685,611 B1
(45) Date of Patent: Feb. 3, 2004

(54) RING HOLDER FOR ROLL RING

(75) Inventor: Uwe Kark, Hamburg (DE)

(73) Assignee: Kark AG, Hamburg (DE)

( * ) Notice: Subject to any disclaimer, the term of this patent is extended or adjusted under 35 U.S.C. 154(b) by 0 days.

(21) Appl. No.: 10/300,073

(22) Filed: Nov. 20, 2002

(30) Foreign Application Priority Data

Aug. 21, 2002 (DE) .......................................... 202 12 838

(51) Int. Cl.⁷ .............................................. F16C 13/00

(52) U.S. Cl. ........................ 492/47; 29/895.22; 29/447

(58) Field of Search .............................. 492/47, 39, 40, 492/45; 29/895.21, 895.212, 895.213, 895.22, 525, 447, 446, 448, 453

(56) References Cited

U.S. PATENT DOCUMENTS

| | | | | |
|---|---|---|---|---|
| 3,577,619 A | * | 5/1971 | Strandel | 492/47 |
| 4,019,824 A | * | 4/1977 | Percy | 403/261 |
| 4,274,185 A | * | 6/1981 | Mifune et al. | 492/40 |
| 4,399,598 A | * | 8/1983 | Page et al. | 432/246 |
| 4,841,612 A | * | 6/1989 | Kark | 492/40 |
| 4,880,343 A | * | 11/1989 | Matsumoto | 411/222 |
| RE33,490 E | * | 12/1990 | Steinbock | 492/2 |
| 5,366,331 A | * | 11/1994 | Erbes | 411/433 |
| 5,735,788 A | * | 4/1998 | Yasutake et al. | 492/39 |

* cited by examiner

*Primary Examiner*—Gregory Vidovich
*Assistant Examiner*—Marc Jimenez
(74) *Attorney, Agent, or Firm*—Alix, Yale & Ristas, LLP

(57) ABSTRACT

A ring holder for clamping a roll ring to a roll shaft between two annular abutments employs at least one removable abutment. The removable abutment is formed by a split ring which is supported on a shaft collar and held by a fixing ring which surrounds the split ring parts.

4 Claims, 2 Drawing Sheets

RING HOLDER FOR ROLL RING

An axially acting clamping device is used for fastening roll rings on roll shafts. It acts between two annular abutments, of which at least one is removable for the fitting of the roll rings. They are as a rule formed by a shaft collar on the one hand, which is connected in one piece to the shaft, and by a threaded ring on the other hand, which sits on a shaft thread (U.S. Pat. No. 4,008,598, U.S. Pat. No. 4,117, 705). When the shaft is subjected to a bending stress at the location of the threaded ring, the thread does not bear uniformly over the entire circumference but mainly on the bending pressure side of the shaft. Since this side rotates, the thread is subjected to an alternating stress, which may lead to failure.

The object of the invention is to provide an arrangement which is more able to cope with the stress than a threaded ring.

SUMMARY OF THE INVENTION

The solution according to a preferred embodiment of the invention comprises a roll arrangement having a roll shaft and at least one roll ring which is clamped thereon between two annular abutments of which at least one is removable. The removable abutment is formed by a split ring which is supported on a shaft collar and whose parts are held by a fixing ring surrounding them. This fixing ring is expediently prestressed, in particular shrunk in place. For fitting purposes, the outside diameter of the shaft collar, on which the split ring is supported, should be smaller than the inside diameter of the roll ring.

BRIEF DESCRIPTION OF THE DRAWINGS

The invention is explained below in more detail with reference to the drawing, which illustrates an advantageous exemplary embodiment. In the drawing.

DETAILED DESCRIPTION OF THE PREFERRED EMBODIMENT

Figure 1:
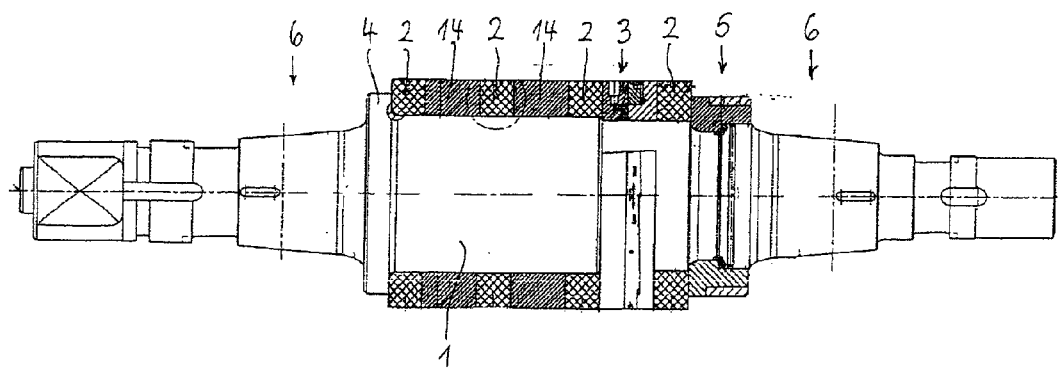
FIG. 1 shows a partly sectioned view of the entire arrangement.

The roll rings 2 are shrunk onto the roll shaft 1. They are axially clamped by a clamping device 3. In the process, they are supported on the one hand on an abutment formed by the shaft collar 4 and on the other hand on a removable abutment 5. The shaft is mounted in the regions 6 and is subjected to a bending stress.

Figure 2:
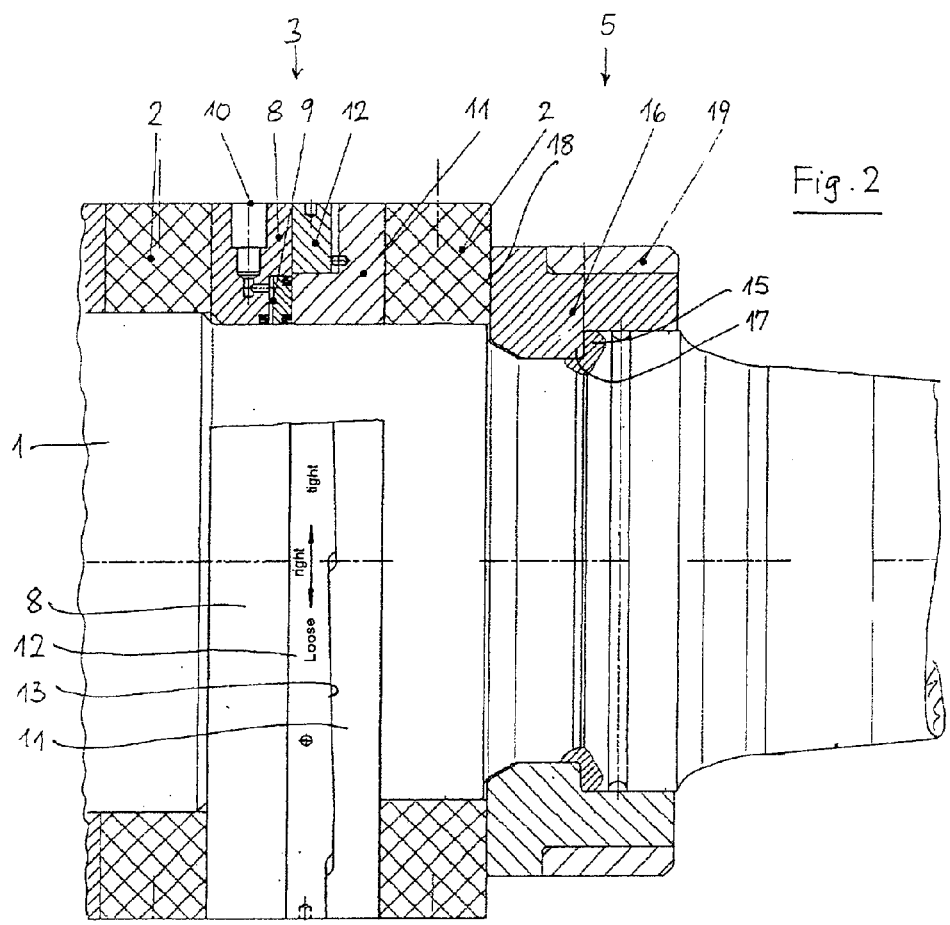
FIG. 2 shows a longitudinal section through the relevant part of the roll arrangement on a larger scale.

Details of the clamping device 3 and of the removable abutment 5 can be seen from FIG. 2. The clamping device corresponds to a known principle (EP-B-343440). A thrust ring 8, which is supported axially on the adjacent roll ring 2, contains a piston/cylinder unit 9, to which a pressure medium can be directed via the connection 10. The piston/cylinder unit 9 presses axially against a "wedge ring" 11, which accommodates an adjusting ring 12 in an annular cutout. Those flanks 13 of the wedge ring 11 and of the adjusting ring 12 which face one another are configured in a saw-tooth shape, so that, by rotating the adjusting ring 12 relative to the wedge ring 11, their common axial length can be adjusted. The axial distance between those end faces of the abutments 4 and 5 which face one another corresponds, with slight assembly play, to the common length of the roll rings 2, the intermediate rings 14 and the clamping device 3 when the latter is in its axially shortest setting state. Once these parts have been mounted on the shaft 1, pressure is applied to the piston/cylinder unit 9, the adjusting ring 12 is tightened, and the piston/cylinder unit 9 is relieved of pressure. The roll rings are then axially clamped between the abutments 4 and 5 by the clamping device 3. To this extent, the arrangement may be considered to be known.

The removable abutment 5 comprises a shaft collar 15 and a ring 16 which is preferably split into two halves and is supported with an annular projection 17 on the end face of the collar 15. A stop surface 18 of this ring 16 faces the adjacent roll ring 2. Since the average diameter of the stop surface 18 is greater than the average diameter of the end face of the collar 15, the ring 16 is subjected to a torque which attempts to twist it away from the shaft in its region adjacent to the roll ring 2. This is prevented by a fixing ring 19 which is shrunk in place on the split ring 16. Its prestress is so great that the parts of the ring 16 cannot lift from the shaft under the axial force.

Figure 3:
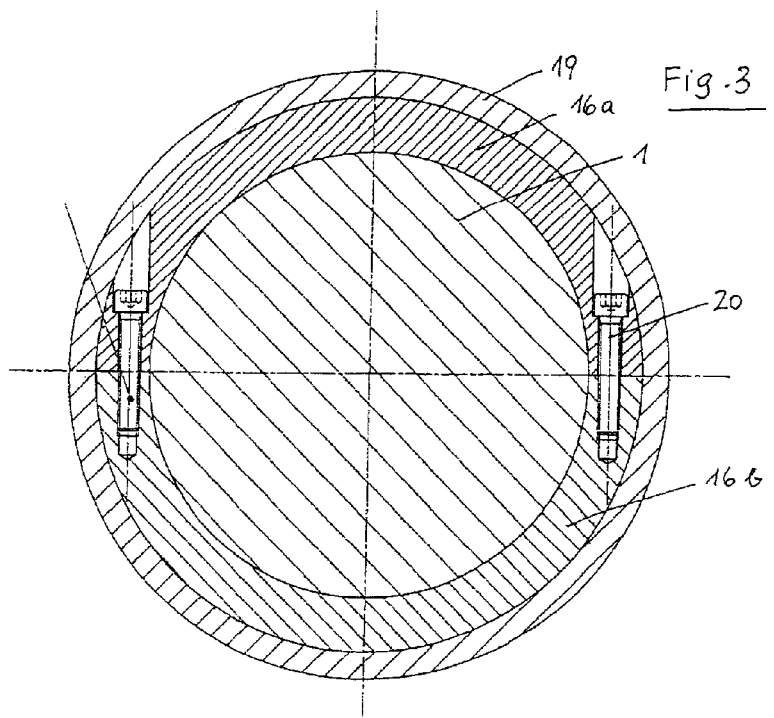
FIG. 3 shows a cross section.

As can be seen from FIG. 3, the parts 16a and 16b of the ring 16 are held together by screws 20 or other fastening means, which, however, serve more to fix the ring parts 16a, 16b in a preliminary manner during assembly than to fix them under the operationally effective forces. They may be replaced by any other desired fixing means having a preliminary effect or may be completely dispensed with.

Figure 4:
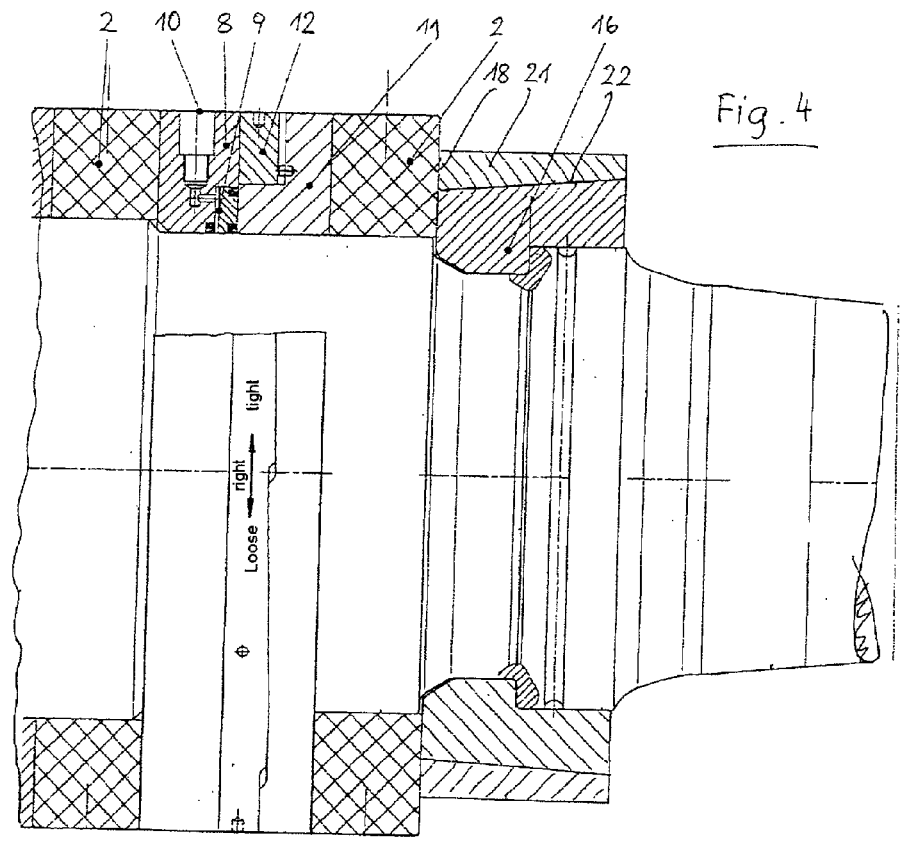
FIG. 4 shows an alternative arrangement.

In the embodiment variant according to FIG. 4, which—in so far as not described below—corresponds to the embodiment in FIG. 2, the fixing ring 21 interacts with the split ring 16 via a conical surface 22. The dimensions are selected in such a way that, when the fixing ring 21 has been pushed completely, i.e. with aligned end face 18, onto the split ring 16, the fixing ring is prestressed to such an extent that its prestressing force acting radially inwards is greater than the forces acting radially outwards on it under the axial operating forces. As a result, the ring 16 is prevented from lifting off the shaft 1.

What is claimed is:

1. Roll arrangement having a roll shaft and at least one roll ring which is clamped thereon between two annular abutments, on which at least one abutment is removable, characterized in that the removable abutment is formed by a split ring supported on a shaft collar, said split ring comprising parts that are held against said roll shaft and surrounded by a fixing ring that is shrunk in place on an exterior surface of the split ring.

2. Roll arrangement according to claim 1, characterized in that the fixing ring is prestressed.

3. Roll arrangement according to claim 2, characterized in that the outside diameter of the shaft collar is not greater than the inside diameter of the roll ring.

4. Roll arrangement according to claim 1, characterized in that the outside diameter of the shaft collar is not greater than the inside diameter of the roll ring.

* * * * *

(12) EX PARTE REEXAMINATION CERTIFICATE (5477th)
United States Patent
Kark

(10) Number: US 6,685,611 C1
(45) Certificate Issued: Aug. 15, 2006

(54) RING HOLDER FOR ROLL RING

(75) Inventor: Uwe Kark, Hamburg (DE)

(73) Assignee: Kark AG, Hamburg (DE)

Reexamination Request:
No. 90/007,609, Jun. 30, 2005

Reexamination Certificate for:
Patent No.: 6,685,611
Issued: Feb. 3, 2004
Appl. No.: 10/300,073
Filed: Nov. 20, 2002

(30) Foreign Application Priority Data

Aug. 21, 2002 (DE) .......................... 202 12 838

(51) Int. Cl.
*B25F 5/02* (2006.01)

(52) U.S. Cl. .................. 492/47; 29/895.22; 29/447
(58) Field of Classification Search .............. 492/47
See application file for complete search history.

(56) References Cited

U.S. PATENT DOCUMENTS

| 3,689,126 A | 9/1972 | Hayashi et al. |
| RE28,581 E | * 10/1975 | Koch .......................... 492/38 |
| 4,008,598 A | 2/1977 | Purcupile et al. |
| 4,117,705 A | 10/1978 | Dempsey |
| 4,817,410 A | 4/1989 | Yatsuzuka et al. |

FOREIGN PATENT DOCUMENTS

| DE | 2118627 | 11/1971 |
| DE | 25 28 157 A1 | 7/1976 |
| DE | 26 01 138 A1 | 7/1977 |
| DE | 30 22 554 | 1/1981 |
| DE | 37 20 144 A1 | 12/1987 |
| DE | 94 10 933.1 | 7/1994 |
| DE | 198 28 628 C1 | 2/2000 |
| GB | 2 053 339 A | 6/1980 |
| JP | 59035816 | 2/1984 |

OTHER PUBLICATIONS

International Search Report No. PCT/EP 03/09220 dated Nov. 27, 2003.
German Search Report for DE Application No. 20212838.5 dated Feb. 13, 2003.
English Abstracts of German Patent Documents from DERWENT.

* cited by examiner

*Primary Examiner*—Beverly M. Flanagan

(57) ABSTRACT

A ring holder for clamping a roll ring to a roll shaft between two annular abutments employs at least one removable abutment. The removable abutment is formed by a split ring which is supported on a shaft collar and held by a fixing ring which surrounds the split ring parts.

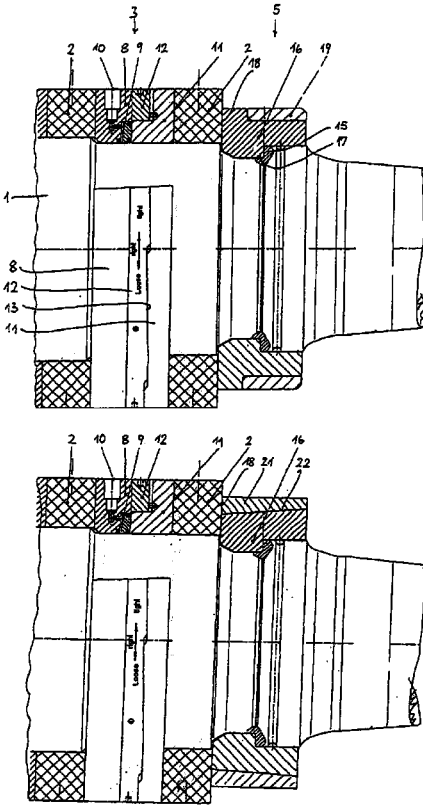

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 is confirmed.

* * * * *